United States Patent
Yang et al.

(10) Patent No.: US 8,364,403 B2
(45) Date of Patent: Jan. 29, 2013

(54) PORTABLE NAVIGATION DEVICE PROVIDING CONVERSATIONAL SYSTEM AND PROCESSING METHOD THEREOF

(75) Inventors: Yin-pin Yang, Taipei (TW);
Ching-Chung Chan, Taipei (TW);
Xiao-Ming Lin, Taipei (TW)

(73) Assignee: Mitac International Corp., Taoyuan (TW)

( * ) Notice: Subject to any disclaimer, the term of this patent is extended or adjusted under 35 U.S.C. 154(b) by 671 days.

(21) Appl. No.: 12/566,729

(22) Filed: Sep. 25, 2009

(65) Prior Publication Data

US 2010/0082229 A1    Apr. 1, 2010

(30) Foreign Application Priority Data

Sep. 26, 2008   (TW) ................................ 97137104 A

(51) Int. Cl.
*G01C 21/00* (2006.01)
*G06Q 10/00* (2006.01)

(52) U.S. Cl. ...................................... 701/541; 705/7.13

(58) Field of Classification Search ........................ None
See application file for complete search history.

(56) References Cited

U.S. PATENT DOCUMENTS

| | | | | |
|---|---|---|---|---|
| 6,732,080 | B1 * | 5/2004 | Blants | 705/7.18 |
| 8,112,299 | B2 * | 2/2012 | Kim et al. | 705/7.18 |
| 2005/0020314 | A1 * | 1/2005 | Choi | 455/564 |
| 2007/0014280 | A1 * | 1/2007 | Cormier et al. | 370/352 |
| 2007/0072629 | A1 * | 3/2007 | Bae | 455/461 |
| 2008/0057910 | A1 * | 3/2008 | Thoresson et al. | 455/412.1 |
| 2008/0209546 | A1 * | 8/2008 | Kim | 726/19 |

* cited by examiner

*Primary Examiner* — Michael J. Zanelli
(74) *Attorney, Agent, or Firm* — Birch, Stewart, Kolasch & Birch, LLP

(57) ABSTRACT

A processing method for a portable navigation device equipped with a conversation system is disclosed. When the portable navigation device is operating in a dumb mode, events are displayed on a screen of the device according to preset conditions and parameters. In a normal mode, events scheduled in the $1^{st}$ to $X^{th}$ order are pushed to the user according to preset conditions, and, in a hype mode, events are displayed on the screen based on preset conditions and parameters while events residing at the top layer of the screen are actively and repeatedly pushed to the user.

21 Claims, 3 Drawing Sheets

PORTABLE NAVIGATION DEVICE PROVIDING CONVERSATIONAL SYSTEM AND PROCESSING METHOD THEREOF

CROSS REFERENCE TO RELATED APPLICATIONS

This Application claims priority of Taiwan Patent Application No. 97137104, filed on Sep. 26, 2008, the entirety of which is incorporated by reference herein.

BACKGROUND OF THE INVENTION

1. Field of the Invention

The present invention relates to human-machine interface (HMI) of portable navigation devices.

2. Description of the Related Art

Driven by advancements in Global Positioning System (GPS) chips, modules, and components, lowering price and size thereof, GPS functions have increasingly been implemented in portable consumer electronic devices. The GPS can be applied in military, aviation, voyage fields, or even in mountain-climbing, positioning or car navigation systems. The car navigation device is the most popular one among the GPS devices.

Car navigation systems are typically divided into two categories: embedded navigation devices (for example, equipped in a car) or portable navigation devices. The portable navigation device may be a consumer electronic product specialized in GPS function or a consumer electronic product, such as a personal digital assistant (PDA) or a smart phone) having a navigation system built therein.

Conventionally, the portable navigation device is of simpler design than the embedded navigation device, but the GPS functions provided by the portable navigation device are enough for the basic use. Today, navigation devices, used mainly in cars, provide improved positioning functions, abundant graphics libraries (for dynamic navigation capabilities, weather condition forecasts, travel guides, voice sound navigation capabilities, online graphics library updates and so on) as well as being integrated with other popular applications.

Some portable navigation devices, used mainly in cars, are equipped with speech recognition functions. Users can operate the portable navigation device without physically touching the controls thereof. For example, users can use voice to operate the portable navigation device to provide information built therein or to provide information the device has retrieved from the network.

However, currently, speech recognition methods do not provide interactive communication between a user and a portable navigation system.

BRIEF SUMMARY OF THE INVENTION

The invention discloses portable navigation devices equipped with a conversation system, and processing methods thereof.

An exemplary embodiment of the processing method of the invention comprises the following steps. After a portable navigation device is turned on, the method performs a preprocessing operation to retrieve a content provider to obtain events preset therein and to schedule the events according to priority scores thereof and then the method displays the scheduled events on a screen of the portable navigation device and determines whether the value of a conversation mode setting of the portable navigation device is greater than a predetermined value. When the conversation system setting is greater than the predetermined value, the portable navigation system informs a user, by sound and at every predetermined time period, of the events displayed on the screen and scheduled in the $1^{st}$ to the $N^{th}$ order, wherein N is an integer greater than 1, and the values of N and the predetermined time period may be dependent on the value of the conversation mode setting. The method further comprises determining whether an external trigger or a user input has occurred. When an external trigger or a user input has occurred, the method calculates a priority score of an event relating to the external trigger or the user input, and determines whether the priority score of the event relating to the external trigger or the user input is greater than a threshold value. When the priority score of the event relating to the external trigger or the user input is greater than the threshold value, the method accordingly reschedules all events (based on the priority score of the event relating to the external trigger or the user input), and displays the rescheduled events on the screen.

An exemplary embodiment of the portable navigation device of the invention comprises a knob, a database, a screen, a calculating unit, a voice module, and a microprocessor. The knob sets a conversation mode setting of the portable navigation device. The database stores events retrieved from a content provider. The events are scheduled according to priority scores thereof and the screen displays the scheduled events. Furthermore, the screen is capable of receiving user inputs to generate events. The calculating unit calculates a priority score for an event relating to an external trigger or user input. The voice module talks to a user at every predetermined time period of the events displayed on the screen and scheduled in the $1^{st}$ to the $N^{th}$ order, where N is greater than 1 and the values of N and the predetermined value may be dependent on the conversation mode setting. The microprocessor determines whether the priority score of the event relating to the external trigger or the user input is greater than a threshold value. When the priority score of the event relating to the external trigger or the user input is greater than the threshold value, the microprocessor accordingly reschedules the events (based on the priority score of the event relating to the external trigger or the user input), and displays the rescheduled events on the screen.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

The invention discloses portable navigation devices equipped with a conversation system, and processing methods thereof.

Figure 1:
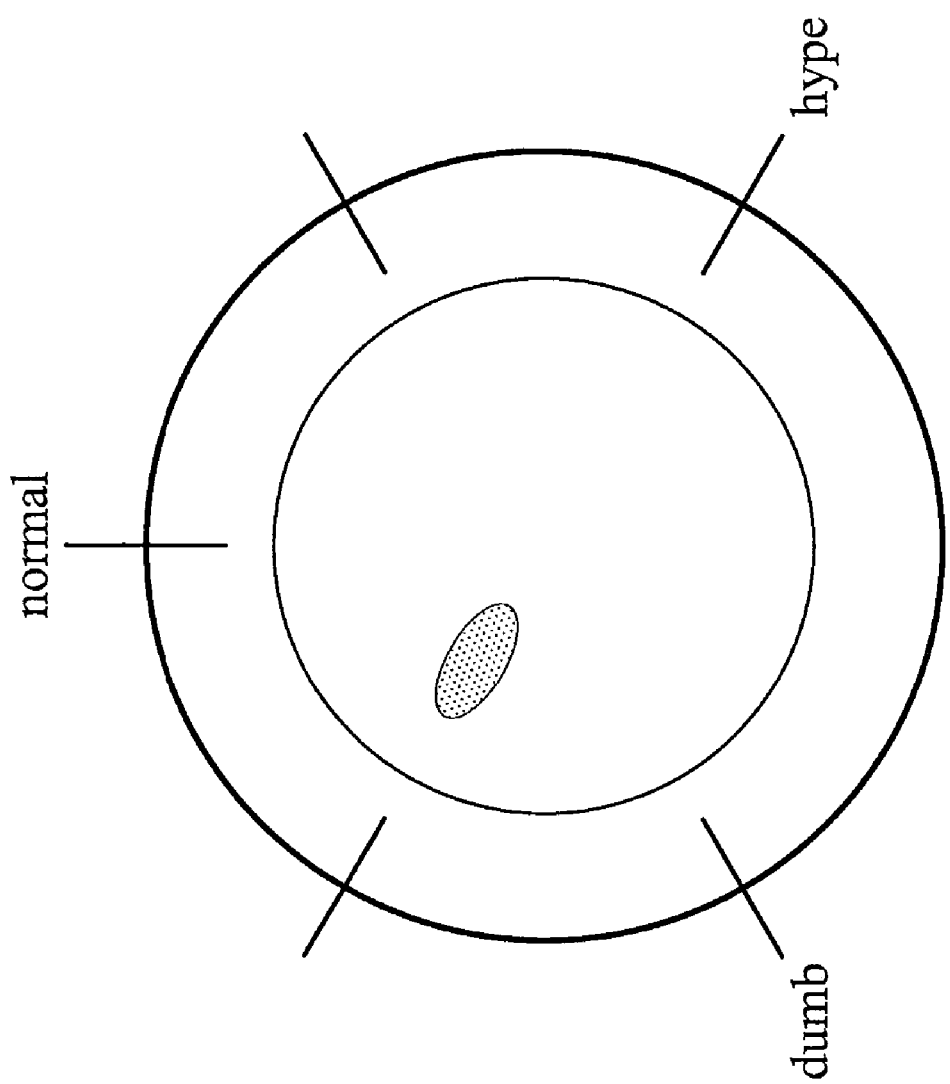
FIG. 1 depicts a knob assembled on an embodiment of the portable navigation device of the invention, wherein the knob sets the conversation mode setting of the portable navigation device.

FIG. 1 depicts a knob assembled on an embodiment of the portable navigation device of the invention.

In this embodiment, the portable navigation device equipped with a conversation system has a TK knob (Talkativeness knob). The TK knob provides three mode options: a dumb mode, a normal mode and a hype mode, to control the conversation system of the portable navigation device.

In the dumb mode, the portable navigation device displays events on a screen thereof according to preset conditions and parameters rather than informing a user by sound. Furthermore, the portable navigation device modifies the priority ordering of the events shown at a top layer of the screen according to user inputs (by sound or keystrokes) and corresponding weighting parameters. The priority ordering of the events may determine the order the events are shown in the screen. Note that in some embodiments the portable navigation device modifies the priority ordering of the events shown at a top layer of the screen according to the external triggers and the corresponding weighting parameters without actively informing the user about the events on the screen.

When the portable navigation device is switched to the hype mode, the portable navigation device displays events on the screen according to preset conditions and parameters, and actively and repeatedly informs the user of the events shown at a top layer of the screen. Furthermore, the portable navigation device modifies the priority ordering of the events shown at a top layer of the screen according to external triggers and the corresponding parameters and actively informs the user of the events shown at a top layer of the screen according to the scheduled results.

When the portable navigation device is switched to the normal mode, the portable navigation device modifies the priority ordering of the events shown at a top layer of the screen according to external triggers and the corresponding weighting parameters and informs the user about the events scheduled in the $1^{st}$ to the $X^{th}$ order (X>1) by sound. Note that in some embodiments X may be 2 or 3, which represents that the portable navigation device only actively informs the user of the events scheduled in the $1^{st}$ to the $2^{nd}$ (while X=2) or to the $3^{rd}$ (while X=3) order. X can be changed to other values rather than 2 or 3. Furthermore, in some embodiments, when a user input (by sound or keystroke) occurs, the portable navigation device informs the user about the corresponding event of the user input by voice.

The knob may provide more options for conversation mode setting. For example, the knob may provide 5 options (labeled from 0 to 4) for conversation mode setting. The first conversation mode (labeled by 0, and the value of the conversation mode setting is 0) may be the dumb mode, the third conversation mode (labeled by 2, and the value of the conversation mode setting is 2) may be the normal mode, and the fifth conversation mode (labeled by 4, and the value of the conversation mode setting is 4) may be the hype mode. When the knob is rotated to the second conversation mode (labeled by 1, and the value of the conversation mode setting is 1), the portable navigation device modifies the priority ordering of the events shown at a top layer of the screen according to the external trigger and the corresponding weighting parameters, and actively informs the user, according to preset conditions, of the events scheduled in the $1^{st}$ to the $Y^{th}$ order, where Y is greater than 1 and is smaller than X. When the knob is rotated to the fourth conversation mode (labeled 3, and the value of the conversation setting is 3), the portable navigation device actively informs the user, according to the preset conditions, of the events scheduled in the $1^{st}$ to the $Z^{th}$ order, where Z is greater than 1 and is greater than X.

The five conversation modes provide an exemplary embodiment of the invention and are not intended to limit the scope of the invention. The amount of the conversation modes can be more than 5, and is dependent upon user design. Additionally, the conversation modes may be arranged in another order, for example, the conversation mode 0 may not represent the dumb mode.

Figure 2:
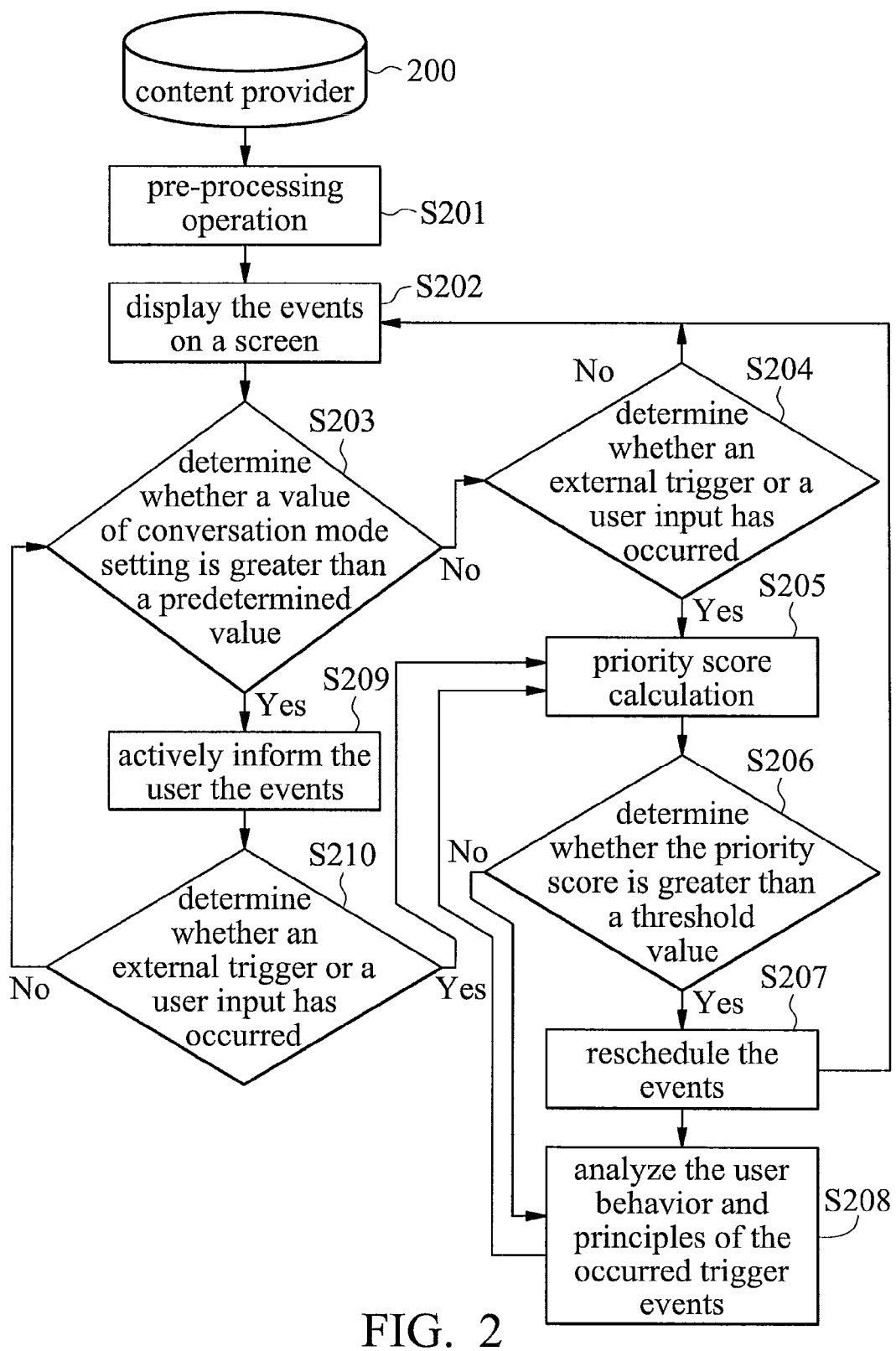
FIG. 2 shows a flowchart, depicting an exemplary embodiment of the processing method of the portable navigation device of the invention.

FIG. 2 shows a flowchart, depicting the processing method of the portable navigation device of the invention.

After the portable navigation device is turned on, a preprocessing operation is performed (step S201) to retrieve preset events from a content provider 200 and schedule the events according to priority scores of the events. In step S202, the scheduled events are displayed on a screen of the portable navigation device. In step S203, the method determines whether a value of a conversation mode setting of the portable navigation device is greater than a predetermined value.

Based on the embodiment providing at least five conversation modes (labeled from 0 to 4), with the exception of the dumb mode (the value of the conversation mode setting is 0), during all other modes, the portable navigation device actively informs the user about the displayed events. The predetermined value used in step S203 may be set to 0.

When the value of the conversation mode setting is not greater than the predetermined value, the step S204 is performed to determine whether an external trigger or a user input has occurred. When there is no external trigger or user input, step S202 is performed. When an external trigger or a user input has occurred, step S205 is performed to calculate a priority score of an event relating to the external trigger or the user input. In step S206, it is determined whether the priority score in step S205 is greater than a threshold value (for example, 80 points).

When the priority score is greater than the threshold value, step S207 is performed to reschedule the events and then step S202 is performed to display the events on the screen according to the rescheduled results. Furthermore, in step S208 the received event (relating to an external trigger or a user input) is analyzed to obtain the principles of the external triggers or to obtain user behaviors. The analyzed results are transmitted to be implanted in the priority score calculation (step S205) and are taken into account in sequential priority score calculations. When the priority score is not greater than the threshold value, step S208 is performed without processing step S207; wherein the received event is analyzed to obtain principles of the external triggers or to obtain user behaviors, and the analyzed results are transmitted to be implanted in the priority score calculation (step S205) and taken into account in sequential priority score calculations.

When, in step S203, it is determined that the value of the conversation mode setting is greater than the predetermined value, step S209 is performed, wherein the portable navigation device actively informs the user, by sound and at predetermined time periods, about the events displayed on the screen and scheduled in the $1^{st}$ to the $N^{th}$ order. The predetermined time period and the value of N are dependent on the value of the conversation mode setting. For example, the predetermined time period may be 20 seconds, 10 seconds, 5 seconds or 1 second. Based on the said embodiments, the portable navigation device may actively inform the user of the events in the first order when the value of the conversation mode setting is 1, in the $1^{st}$ to the $2^{nd}$ order when the value of the conversation mode setting is 2, and in the $1^{st}$ to the $3^{rd}$ order when the value of the conversation mode setting is 3. When the value of the conversation mode setting is 4, the portable navigation device may repeatedly inform all events to the user.

In step S210, it is determined whether an external trigger or a user input (by voice or keystroke) has occurred. When no external trigger or user input has occurred, step S203 is performed. When an external trigger or a user input has occurred, step S205 is performed to calculate a priority score of the event relating to the external trigger or the event and then in step S206, it is determined whether the priority score in step S205 is greater than the threshold value.

When the priority score is greater than the threshold value, step S207 is performed to reschedule the events based on the priority score of the event relating to the external trigger or the user input and then in step S202, the rescheduled events are displayed on the screen. Then, in step S208, the principles of the occurred external triggers and the user behaviors are analyzed. The analyzed results are transmitted to be implanted in the priority score calculation (step S205) and taken into account in sequential priority score calculations. When the priority score is not greater than the threshold value, the scheme bypasses step S207 and performs step S208; the received event is analyzed to obtain the principles of the occurred external triggers or to obtain the user behaviors. The analyzed results are transmitted to be implanted in the priority score calculation (step S205) and taken into account in sequential priority score calculations.

The external triggers may be a positioning event, a time event or a detector or detecting event and so on of GPS system. In other embodiments, the external triggers may come through network (such as real-time traffic report from a digital broadcast or far-end server information by wireless communication) or in other cases, the external triggers may provide information about local activities, weather conditions, news and so on. In some embodiments, the external triggers may be a preset time period, weather condition, a position notification, a speed notification, or a navigation mode (for pedestrians or for cars) notification, or combinations thereof.

In some embodiments, a key word may be selected when the navigation device receives an external trigger or a user input. The priority score of the selected keyword may be increased according to the corresponding parameters (such as link intensity or weighting parameters generated accordingly), and the parameters (such as the link intensity) of the selected neighboring keywords may be accordingly increased. The parameters in the exemplary embodiments do not limit the scope of the invention. Different parameters may be selected for different embodiments.

Figure 3:
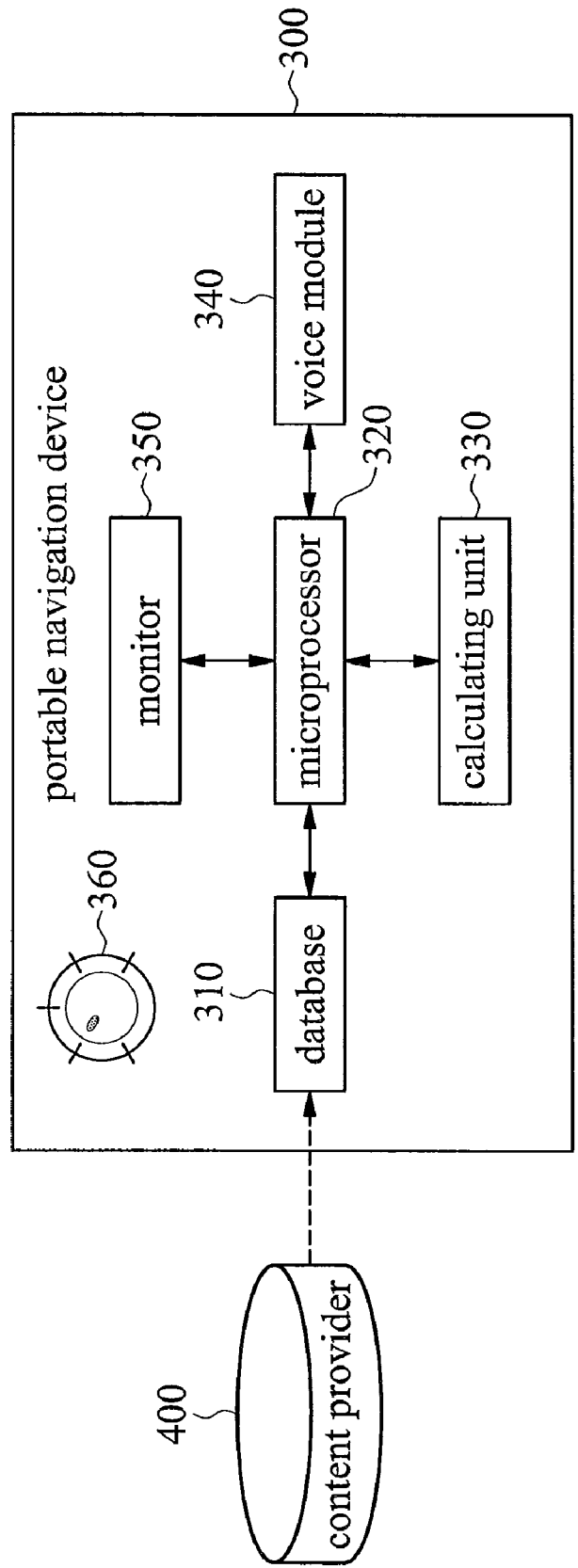
FIG. 3 depicts the architecture of an embodiment of the portable navigation devices of the invention.

FIG. 3 depicts the architecture of an embodiment of the portable navigation devices of the invention.

As shown, the portable navigation device 300 comprises a database 310, a microprocessor 320, a calculating unit 330, a voice module 340, a screen 350 and a knob 360. The screen 350 may be a touch panel.

When the portable navigation device 300 is turned on, the microprocessor 320 performs a pre-processing operation, to retrieve from a content provider 400 (or a far-end server), preset events and to store the retrieved events in the database 310. According to the calculations of the calculating unit 330, the microprocessor 320 schedules the events based on priority scores thereof and displays the scheduled events on the screen 350 according to the scheduling order.

The microprocessor 320 determines the status of the knob 360 to obtain the conversation mode, and determines whether the value of the conversation mode setting is greater than a predetermined value. When the value of the conversation mode setting is not greater than the predetermined value, the microprocessor 320 determines whether an external trigger or a user input has occurred. When an external trigger or a user input has occurred, the calculating unit 330 calculates the priority score of a event relating to the external trigger or the user input and then the microprocessor 320 determines whether the priority score is greater than a threshold value (for example, 80 points).

When the priority score of the event relating to the external trigger or the user input is greater than the threshold value, the microprocessor 320 reschedules the events according to the priority score of the event relating to the external trigger or the user input. The microprocessor 320 displays the rescheduled events on the screen 350 and analyzes the received events to obtain the principles of the occurred external triggers or to obtain the user behaviors. The analyzed results are transmitted to be implanted in the priority score calculation and are taken into account in sequential priority score calculations. When the priority score of the event relating to the external trigger or the user input is not greater than the threshold value, the microprocessor 320 analyzes the received event without the rescheduling process. The analyzed results are transmitted to be implanted in the priority score calculation and are taken into account in sequential priority score calculations.

When the value of the conversation mode setting is greater than the predetermined value, the voice module 340 actively informs the user, at every predetermined time period, of the events displayed on the screen 350 and scheduled in the $1^{st}$ to $N^{th}$ order. The values of N and the predetermined time period are dependent on the conversation mode. For example, the predetermined time period may be 20 seconds, 10 seconds, 5 seconds, or 1 second. The microprocessor 320 then determines whether an external trigger or a user input (by voice or keystroke) has occurred. When there is an external trigger or a user input, the calculating unit 330 calculates the priority score thereof, and determines whether the priority score is greater than the threshold value.

When the priority score is greater than the threshold value, the microprocessor 320 reschedules the events and displays the rescheduled events on the screen 350 and then analyzes the external trigger or the user input to obtain behavior principles thereof. The analyzed results are transmitted to be implemented in the priority score calculation and are taken into account in sequential priority score calculations. When the priority score of an event relating to the external trigger or the user input is not greater than the threshold value, the microprocessor 320 analyzes the received event to obtain user behaviors or the principles of the occurred external triggers, wherein the aforementioned rescheduling step is omitted. The analyzed results are transmitted to be implanted in the priority score calculation and are taken into account in sequential priority score calculations.

The invention further discloses storage media (such as an optical disc, a floppy disc, or a removable hard disc) recording a computer readable right permission program which realizes the processing methods of the portable navigation devices equipped with a conversation system. The program is basically composed of several codes, such as code segments for architecture building, code segments for permission tables, code segments for system settings, and code segments for program allocation. The code segments may realize the steps or functions of the embodiments of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing method for a portable navigation device equipped with a conversation system, comprising:

performing a pre-processing operation after the portable navigation device is turned on, to retrieve a content provider to obtain events preset therein and to schedule the events according to priority scores of the events;

displaying the events on a screen of the portable navigation device according to the scheduling of the events;

actively informing a user, by sound and at every predetermined time period while a value of a conversation mode setting of the portable navigation device is determined greater than a predetermined value, of the events displayed on the screen and scheduled in the $1^{st}$ to the $N^{th}$ order, where N is a integer greater than one;

calculating a priority score of an event relating to an external trigger or a user input;

rescheduling all events when the priority score of the event relating to the external trigger or the user input is determined greater than a threshold value; and displaying the rescheduled events on the screen.

2. The method as claimed in claim 1, wherein the values of N and the predetermined time period are dependent on the value of the conversation mode setting.

3. The method as claimed in claim 1, further comprising:

analyzing the event relating to the external trigger or the user input to obtain principles of the occurred external triggers or to obtain user behaviors; and calculating the priority score by taking the obtained principles or user behaviors into consideration for subsequent priority score calculations.

4. The method as claimed in claim 1, wherein the external trigger comes through a network or provides information about local activities, weather condition, and news.

5. The method as claimed in claim 1, wherein the external trigger is a preset time period, weather condition, a position notification, a speed notification, or a navigation mode notification, or combinations thereof.

6. The method as claimed in claim 1, wherein the portable navigation device provides a first conversation mode, a second conversation mode and a third conversation mode.

7. The method as claimed in claim 6, wherein when the portable navigation device is switched to the first conversation mode, the events retrieved from the content provider are displayed on the screen according to preset conditions and preset parameters.

8. The method as claimed in claim 7, wherein when the external trigger or the user input is received, the events shown at a top layer of the screen are rescheduled according to weighting parameters corresponding to the external trigger or the user input.

9. The method as claimed in claim 6, wherein when the portable navigation device is switched to the second conversation mode, the method comprises actively informing the user, by sound, of the events scheduled in the $1^{st}$ to the $X^{th}$ order, wherein $X \geq 1$.

10. The method as claimed in claim 6, wherein when the portable navigation device is switched to the third conversation mode, the method displays the events retrieved from the content provider on the screen according to preset conditions and preset parameters and actively and repeatedly informs the user of the events displayed at a top layer of the screen.

11. A portable navigation device equipped with a conversation system, comprising:

a knob, for setting a value of a conversation mode setting of the portable navigation device;

a database, storing a plurality of events retrieved from a content provider;

a screen, displaying the events according to priority scores of the events and, when receiving a user input, generating an event relating to the user input;

a calculating unit, calculating a priority score for the event generated by the user input or an external trigger;

a voice module, informing a user, at every predetermined time period, of the events displayed on the screen and scheduled in the $1^{st}$ to the $N^{th}$ order, where N is an integer greater than 1 and the values of N; and a microprocessor, determining whether the priority score of the event relating to the external trigger or the user input is greater than a threshold value and, when the priority score of the event relating to the external trigger or the user input is greater than the threshold value, rescheduling the events and displaying the rescheduled events on the screen.

12. The device as claimed in claim 11, wherein the predetermined time period are dependent on the value of the conversation mode setting.

13. The device as claimed in claim 11, wherein the microprocessor further analyzes the event relating to the external trigger or the user input to obtain principles of the occurred external triggers or to obtain user behaviors, and the obtained principles or user behaviors are transmitted to the calculating unit to be taken into consideration for subsequent priority score calculations.

14. The device as claimed in claim 13, wherein the external trigger comes through a network or provides information about local activities, weather condition and news.

15. The device as claimed in claim 13, wherein the external trigger is a preset time period, weather condition, a position notification, a speed notification, or a navigation mode notification, or combinations thereof.

16. The device as claimed in claim 11, wherein when the priority score of the event relating to the external trigger or the user input is not greater than the threshold value, the microprocessor analyzes the event relating to the external trigger or the user input to obtain principles of the occurred external triggers or to obtain user behaviors, and the obtained principles or user behaviors are transmitted to the calculating unit to be taken into consideration for subsequent priority score calculation.

17. The device as claimed in claim 11, further providing a first conversation mode, a second conversation mode and a third conversation mode.

18. The device as claimed in claim 17, wherein when the portable navigation device is switched to the first conversation mode, the events retrieved from the content provider are displayed on the screen according to preset conditions and preset parameters.

19. The device as claimed in claim 18, wherein when the external trigger or the user input is received, the events shown at a top layer of the screen are rescheduled according to weighting parameters corresponding to the external trigger or the user input.

20. The device as claimed in claim 17, wherein when the portable navigation device is switched to the second conversation mode, the events scheduled in the $1^{st}$ to the $X^{th}$ order are actively informed to the user, where $X \geq 1$.

21. The device as claimed in claim 17, wherein when the portable navigation device is switched to the third conversation mode, the events retrieved from the content provider are displayed on the screen according to preset conditions and preset parameters, and the portable navigation actively and repeatedly informs the user about the events displayed at a top layer of the screen.

* * * * *